Figure 1:
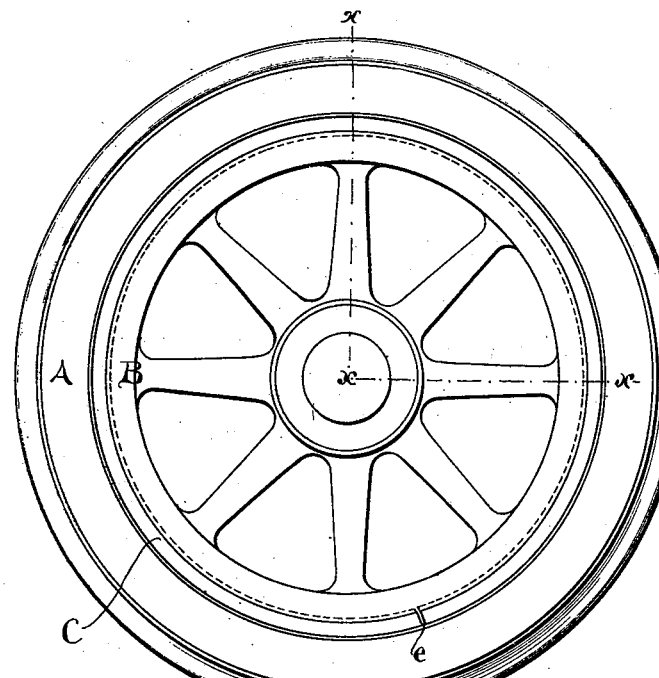

(No Model.) 2 Sheets—Sheet 1.

F. W. TAYLOR.
CAR WHEEL.

No. 404,126. Patented May 28, 1889.

WITNESSES:
Henry Drury
David S. Williams

INVENTOR:
Frederick W. Taylor,
by his attorney,
H. W. Hare Powel.

(No Model.) 2 Sheets—Sheet 2.

F. W. TAYLOR.
CAR WHEEL.

No. 404,126. Patented May 28, 1889.

WITNESSES:
Henry Drury
David S. Williams

INVENTOR:
Frederick W. Taylor,
by his Attorney,
H. W. Hare Powel.

UNITED STATES PATENT OFFICE.

FREDERICK W. TAYLOR, OF PHILADELPHIA, PENNSYLVANIA.

CAR-WHEEL.

SPECIFICATION forming part of Letters Patent No. 404,126, dated May 28, 1889.

Application filed February 11, 1889. Serial No. 299,547. (No model.)

*To all whom it may concern:*

Be it known that I, FREDERICK W. TAYLOR, of the city and county of Philadelphia, State of Pennsylvania, have invented a new and useful Improvement in Locomotive and Car Wheels; and I do hereby declare that the following is a full, clear, and exact description of the same.

My invention relates to those wheels in which the tire is made separate from the wheel-center; and its chief object is to provide a device which will secure tires to their respective wheel-centers and prevent them from slipping past each other axially as well as from warping apart, or even prevent loose ends and pieces of the tire from separating and flying from the wheel-center should the tires be cracked or fractured in use.

Figure 2:
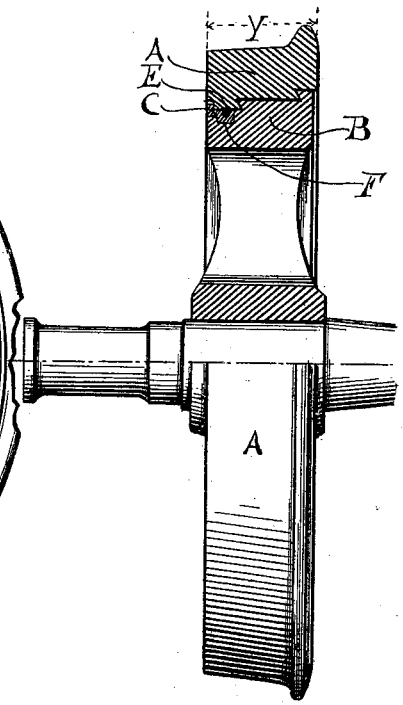
Figure 3:
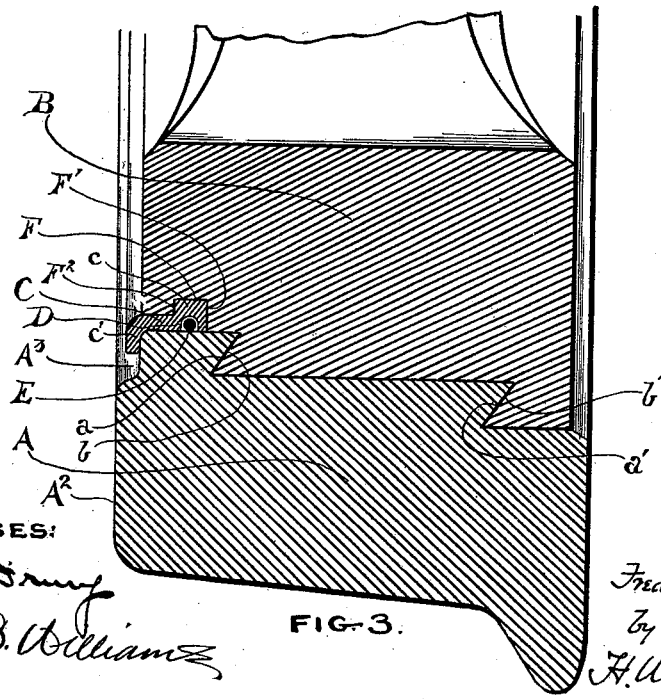
Figure 4:
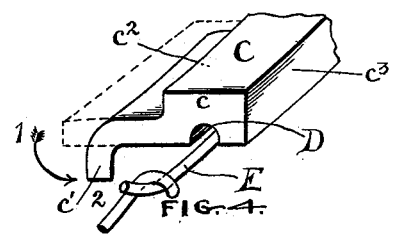
Figures 5, 6:
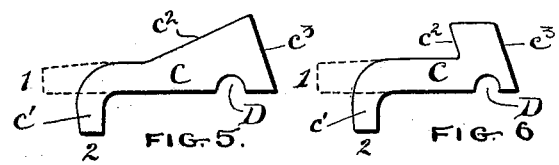
Figure 7:
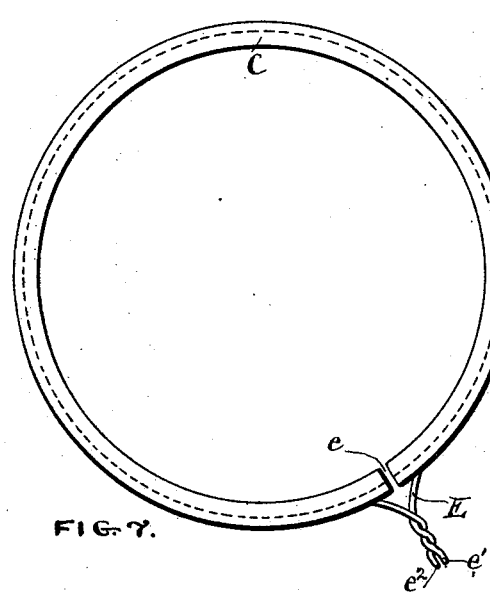
Figure 8:
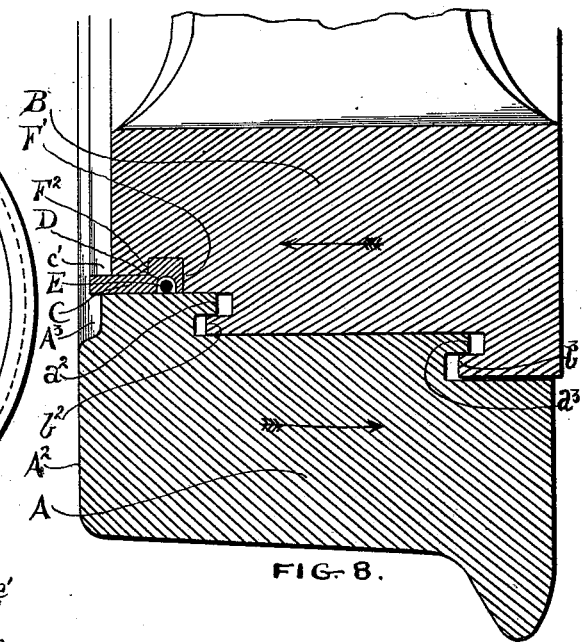
Figure 9:
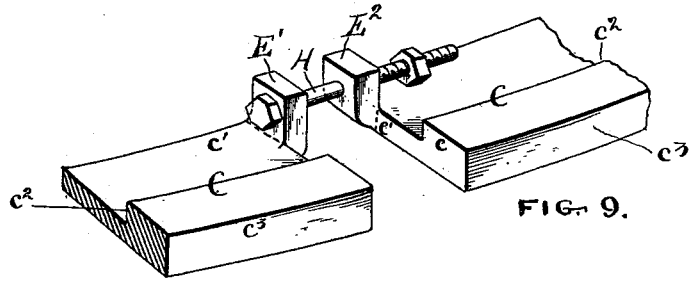

My invention also enables me not only to dispense with bolts and screws as a means of securing the tires in place, but also to dispense with the introduction of webs of metal between the intergripping surfaces employed for radially securing the tires to the wheel-centers, further objects being, in securing the tire or its fragments against radial strains and disruptions, to effect it primarily by the contour opposition and actual contact of certain portions of the tire and wheel-center themselves; also, in preventing the slipping of the tire axially across the wheel center under thrusts such as the flanges of wheels running around railway curves develop—to do so by opposing thereto the direct abutment of the aforesaid intergripping portions of such tire and wheel-center; also, in devising a means for retaining the tire from backing off from such mutual intergripping with the wheel-center, to do so with as little sacrifice of the available base between the tire and wheel-center as possible, as well as to locate said retaining device in such portion as may least weaken the wheel; also, in promoting the integrity of the contact between the tire and wheel-center, to separate the intergripping device into two or more lateral zones, and by thus preventing separation upon opposite sides of an intermediate contact-base to check warping and the eel-skinning or peeling-off tendency of the tire from the wheel-center in ordinary service as distinguished from the extraordinary prevention of loose ends or the flying of fragments should the tire burst; but, reference being now had to the accompanying drawings, forming part of this specification, in which similar letters of reference indicate similar parts throughout the figures, they will be found to illustrate my invention as follows, to wit:

Figure 1 is a side elevation of a wheel embodying my invention; Fig. 2, an elevation of the same at right angles to the former and showing not only an axle inserted therein, but also by removal of the quadrant contained between the dot and dash lines $x\ x\ x$ a cross-section of the rim of the same. Fig. 3 is a radial cross-section through the rim of said wheel upon a larger scale. Fig. 4 is a perspective view of a fragment, showing detail of my retaining device ring and a tie-band in the act of association; Figs. 5 and 6, end views of modified forms of such ring; Fig. 7, a side elevation of the structure shown in Fig. 4; Fig. 8, a cross-section corresponding to that given in Fig. 3 above of a modification of the structure. It is to be noted that in this figure the parts are given when the tire is in the act of being assembled; Fig. 9, a detail of my retaining-ring having modified device for primary assembling such element with wheel-centers; and Fig. 10, a further modification of the retaining device.

A is the tire. B is the wheel-center. They are respectively chambered and ridged into annular steps of cylindrical conformation and increasing diameters by two or more interlocking annular rabbets, $a\ a'\ b\ b'$, and adapted to register, telescope, and mutually envelop each other as male and female parts when the tire is shrunk on, save that C, which is a malleable flanged retaining-band, preferably of one piece, (but it may consist of several pieces not necessarily joined at their ends,) is introduced as a ring into a laterally-engaging edge-communicating female part or the re-entering annular chamber F of this wheel-center's periphery, so as to lie flush therewith, but project its flange $c'$ to some extent beyond the outside of said wheel-center—that is to say, this ring usurps a portion of the wheel-center's step of smallest diameter—while its main body $c$ conforms to and lies with its shoulders $c^2\ c^3$ buried in the lateral anchorage of the walls $F'\ F^2$ of the chamber F, so that the tire A, when slipped over the wheel-center B, overlies and keeps this ring to place in its seat, while the protruding portion of its (the retaining-ring's) lateral flange c is bent down upon the adjoining and preferably guard-chambered side of the tire B, whereby it holds said tire's rabbets $a$ $a'$ in intimate contact with the opposing abutments offered by the rabbets $b$ $b'$ in the wheel-center, and so prevents the tire from backing off in a direction opposite to them.

Figure 10:
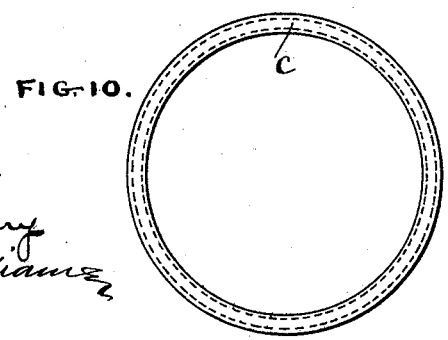

Figs. 1, 2, and 3 graphically illustrate my improved wheel in its preferred construction and form. The intergripping rabbets being here of an inclined or bevel sort, $a$ $a'$ $b$ $b'$, are spread apart and lie in concentric parallel zones at either extremity of an ample base (indicated by the horizontal heavy black lines) connecting said rabbets $a$ $b$ $a'$ $b'$ in the cross-section, Fig. 3, their toeing both tending to draw the tire and wheel-center the more closely together as well as affording an immediate and positive abutment to further passage of the wheel-center and tire along each other in the direction which they assembled in. This direction, it is to be noted, is in Figs. 1 and 3 as I prefer that it should be—from outside inward, (or along the axle.) While retreat from the banking intergrip thus established is precluded by bending onto the adjoining cheek of the tire the protruding flange $c$ of the retaining-band C, which, as shown in said Figs. 1, 2, and 3, was, prior to the slipping on of said tire, applied in the form of an open ring to its seat in the wheel-center, as preferably by means of the wire tie band or withe E, which wire in the groove D, and possibly the interstice $e$ between the ends of said ring, (see Fig. 7,) finds a snug bed not only for its body, but also for its intertwisted or knotted ends $e'$ $e^2$, and offers no opposition to the assembling of the tire, which latter, as its loses its heat, contracts and binds both C and E as well as the wheel-center, otherwise the retaining-ring may be itself continuous, as shown in Fig. 10, and by heating, expanding, and contracting substantially after the manner of shrinking on the tires themselves be slipped to position, and then be shrunk to its seat in the wheel-center.

As a further modification of the retaining-band C, it may be bent into an open ring, and that initially belted to place, as illustrated in Fig. 9, by fastening and bending over terminal eye-lugs $E'$ $E^2$ upon the respective ends of its flange $c'$ and hauling them together, and it to its seat, as by the tension-screw H, the lugs $E'$ $E^2$ being afterward cut off, as indicated in the dotted lines of Fig. 9; but in all cases my retaining-band C comprises an anchorage-body, $c$, adapted to be conformed to engage laterally with internal annular chambering of the wheel-center periphery and a malleable protruding flange, $c'$. Of such rings Figs. 5 and 6, without projection lines, give end views of advantageous though widely differing forms, their respective seats in the wheel-centers with which they are to go, of course, being of correspondingly modified contour, and the dotted extension annexed to them, and designated I, indicating their first cross-sectional position when circumferentially bound to the wheel-center, while the numeral 2 designates their final deflection when bent down upon the tire-cheek, said bending being still more clearly indicated in Fig. 4 by a curved arrow.

Moreover, Fig. 8 not only discloses a rectangular or tongue-and-groove modification of the tire and wheel-center rabbets at $a^2$ $a^3$ $b^2$ $b^3$, respectively, but it also shows them in the act of slipping and telescoping to their mutual engagements with the retaining-ring C, as aforesaid, in its initial condition—viz., with its flange projecting outward and its upper surface in the prolongation of the wheel-center's lowest peripheral step. The arrows shown in this figure on A B, respectively, denote not only the direction and relative motion by which they are assembled, but they also indicate the tendency of "flange-thrusts" to crowd such abutments all the more closely together; also, in the case of such rectangular rabbets as $a^2$ $b^2$ $a^3$ $b^3$, as long as they are in any, even the least, contact with their projecting flanges, there is still an interlocking between the tire and wheel-center from radial or centrifugal strains, and this Fig. 8 illustrates vividly. Finally, the rabbets butted and the retaining-ring once turned down to place, as shown in Fig. 3, against the adjoining vertical cheek of the tire, it secures that tire much after the manner of an enormous annular rivet, and then, as I above say I prefer it should be, a lateral flange, $A^2$, encompassing such ring's flange on the cheek side of the tire, affords that ring a snug protection against accidental blows, &c., by virtue of the guard-chamber $A^3$ thus formed.

A striking advantage of my invention lies in the fact that while the retaining-ring herein described is thoroughly efficient to maintain the tire and wheel-center from backing off from each other during the ordinary strains of service, or even in the extraordinary cases of fracture and jar, it is not called upon in either of those cases to resist radial strains; and it may, for the sake of repairs and fitting new tires in place of worn-out ones, be easily and cheaply removed and renewed.

The tire, too, when shrunk to place upon such a wheel-center and retaining-ring as herein described and claimed, does not require to be pinned; nor is it to be chambered internally for the sake of affording the retaining-ring an anchorage site within its available axial base. (Indicated by the dotted line Y in Fig. 2.)

Having now described my invention, what I claim as new, and desire to secure by Letters Patent, is—

1. As a new article of manufacture, a compound wheel consisting of a tire having on its internal periphery or base two or more rabbeted ascending steps, a wheel-center having a male periphery of corresponding descending rabbeted steps engaging and registering with said tire's base, as well as having within its step of smallest diameter a peripheral annular chamber communicating with said wheel-center's adjoining side, and a retaining-ring having an inwardly and centrally extending body secured within said wheel-center's peripheral chamber by the overlying tire, and having an outwardly-protruding flange bent over onto said tire's adjoining cheek, so as to connect the wheel-center therewith and prevent the retreat of said rabbeted steps from interlocking, substantially as shown and described.

2. As a new article of manufacture, a tire-retaining ring having inwardly or centrally extending shoulders and a laterally-extending flange, the outer surface of said ring being provided with an annular recess or gutter, substantially as shown and described.

FREDERICK W. TAYLOR.

Witnesses:
GEORGE HOUSE,
JOSHUA MATLACK, Jr.